US010460479B2

(12) United States Patent
Lee et al.

(10) Patent No.: US 10,460,479 B2
(45) Date of Patent: *Oct. 29, 2019

(54) DYNAMIC COLOR DETERMINATION FOR USER INTERFACE COMPONENTS OF A VIDEO PLAYER

(71) Applicant: Google LLC, Mountain View, CA (US)

(72) Inventors: Eunjoo Lee, Burlingame, CA (US); Nicholas Michael Kruge, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/843,877

(22) Filed: Dec. 15, 2017

(65) Prior Publication Data

US 2018/0108155 A1    Apr. 19, 2018

Related U.S. Application Data

(63) Continuation of application No. 15/040,989, filed on Feb. 10, 2016, now Pat. No. 9,858,686.

(51) Int. Cl.
*G06T 11/00* (2006.01)
*G06T 7/40* (2017.01)
(Continued)

(52) U.S. Cl.
CPC .............. *G06T 11/001* (2013.01); *G06T 7/90* (2017.01); *G06T 11/00* (2013.01); *G09G 5/026* (2013.01);
(Continued)

(58) Field of Classification Search
CPC .......... G09G 5/06; G09G 5/02; G09G 3/2003; G06T 11/001; G06Q 30/02
See application file for complete search history.

(56) References Cited

U.S. PATENT DOCUMENTS 7,760,935 B2   7/2010  Kim
8,259,129 B2   9/2012  Klassen et al.
(Continued)

FOREIGN PATENT DOCUMENTS

CN    104918098    9/2015
EP    2284799      2/2011
(Continued)

OTHER PUBLICATIONS

Paul Trebilcox-Ruiz; Coloring Android Apps with Palette; Jun. 29, 2015 (https://code.tutsplus.com/tutorials/coloring-android-apps-with-palette--cms-24096).*

(Continued)

*Primary Examiner* — Todd Buttram
(74) *Attorney, Agent, or Firm* — Byrne Poh LLP (57) ABSTRACT

A user interface adaptation module identifies a dominant color of a frame of a video and, based on the dominant color, generates colors for components of a user interface in which the video is displayed. The colors of the user interface components are set based upon the generated colors and upon context information such as a playing state of the video. The setting of the component colors in this way allows the user interface to adjust to complement both the played content of the video and the video's context. In one embodiment, the dominant color is identified by partitioning individual pixels of the frame based on their respective colors. In one embodiment, a set of primary color variants is generated based on the dominant color, and different colors are generated for each type of user interface component based on the different primary color variants.

18 Claims, 5 Drawing Sheets

(51) Int. Cl.
  *G09G 5/02* (2006.01)
  *G06T 7/90* (2017.01)
  *H04N 21/431* (2011.01)
  *H04N 21/44* (2011.01)

(52) U.S. Cl.
  CPC ... *H04N 21/4312* (2013.01); *H04N 21/44008* (2013.01); *G06T 2200/24* (2013.01); *G06T 2207/10016* (2013.01); *G06T 2207/10024* (2013.01); *G06T 2210/62* (2013.01); *G09G 5/02* (2013.01); *G09G 2320/0613* (2013.01); *G09G 2320/0666* (2013.01); *G09G 2320/0686* (2013.01); *G09G 2320/08* (2013.01); *G09G 2320/10* (2013.01); *G09G 2354/00* (2013.01)

(56) References Cited

U.S. PATENT DOCUMENTS

| | | | |
|---|---|---|---|
| 8,532,374 | B2 | 9/2013 | Chen et al. |
| 9,380,259 | B2 * | 6/2016 | Totoki ............... H04N 21/4325 |
| 9,858,686 | B2 * | 1/2018 | Lee ................. H04N 21/44008 |
| 2001/0041008 | A1 | 11/2001 | Kasutani |
| 2005/0180641 | A1 | 8/2005 | Clark |
| 2008/0069475 | A1 | 3/2008 | Ekstrand |
| 2010/0092077 | A1 | 4/2010 | Peters et al. |
| 2012/0019722 | A1 | 1/2012 | Kwisthout et al. |
| 2012/0075330 | A1 | 3/2012 | Klassen et al. |
| 2013/0057566 | A1 * | 3/2013 | Kriese ...................... G09G 5/02 345/589 |
| 2013/0063461 | A1 * | 3/2013 | Viswanathan ........ G06T 15/005 345/582 |
| 2015/0170380 | A1 | 6/2015 | Duwenhorst |
| 2015/0334267 | A1 | 11/2015 | Hirakawa |
| 2017/0228895 | A1 * | 8/2017 | Lee ................. H04N 21/44008 |

FOREIGN PATENT DOCUMENTS

| | | |
|---|---|---|
| JP | 2007013410 | 1/2007 |
| JP | 2010048871 | 3/2010 |
| KR | 10-2009-0005621 | 1/2009 |
| WO | 2014130213 | 8/2014 |
| WO | 2016092059 | 6/2016 |

OTHER PUBLICATIONS

Office Action dated Aug. 6, 2018 in KR Patent Application No. 10-2018-7013736.
Adobe, "Adobe Animate Help: Controlling External Video Playback with ActionScript", Adobe Systems Inc., Jun. 2016, pp. 1-7.
Angelov, M., "Making a Custom Youtube Video Player with Youtube's APIs", Zine EOOD, Jun. 2010, pp. 1-44.
Bhute et al., "IVSS: Integration of Color Feature Extration Techniques for Intelligent Video Search Systems", arXiv preprint, 2013, pp. 1-5.
Brightcove, "Brightcove Native Player Controls," Brightcove, Jun. 2016, pp. 1-4.
International Search Report and Written Opinion dated Mar. 16, 2017 in International Patent Application No. PCT/US2016/068404.
Koster, M., "Creating a Dynamic Silverlight Video Player," Microsoft, 2015, pp. 1-12.
Office Action dated Mar. 23, 2017 in U.S. Appl. No. 15/040,989.
Papercut, "Customizing the User Web Tools Interface", Papercut Software International, Aug. 2012, pp. 1-5.
Trebilcox-Ruiz, P., "Coloring Android Apps with Palette", Envato Pty Ltd., Jun. 2015, pp. 1-14.
Gardner, B., "Extracting Colors to a Palette with Android Lollipop", in bignerdranch.com, last updated Jan. 9, 2015, pp. 1-9, available at: http://bignerdranch.com/blog/extracting-colors-to-a-palette-with-android-lollipop/.
Search Report dated Oct. 5, 2018 in EP Patent Application No. 16890118.9.
Notice of Allowance dated Aug. 25, 2017 in U.S. Appl. No. 15/040,989.
Office Action dated Mar. 15, 2019 in RU Patent Application No. 2018117701.
Office Action dated Jun. 17, 2019 in JP Patent Application No. 2018-524361.

* cited by examiner

DYNAMIC COLOR DETERMINATION FOR USER INTERFACE COMPONENTS OF A VIDEO PLAYER

CROSS-REFERENCE TO RELATED APPLICATIONS

This application is a continuation of U.S. patent application Ser. No. 15/040,989, filed Feb. 10, 2016, which is hereby incorporated by reference herein in its entirety.

TECHNICAL FIELD

The disclosed embodiments relate generally to computer-implemented methods for software application user interfaces, and more specifically, to determining the colors of user interface components within a video player user interface based on content of a video displayed in the video player.

BACKGROUND

User interfaces of software applications are typically relatively static, possibly changing their layouts in response to window resizes, but without significant changes in response to the content that is currently being displayed. This is particularly problematic for video player applications, where the visual presentation of the video—including any user interface components displayed in association with the video itself—may significantly influence the user's viewing experience. For example, distractingly bright user interface components could detract from the viewing of the video itself, as could user interface components with colors that "clash" aesthetically with the content of the video.

SUMMARY

In one embodiment, a computer-implemented method for setting colors of user interface components of a video player to complement a playing video comprises identifying a plurality of frames of the video. For each frame of the identified frames, a number of operations are performed. The operations include identifying a dominant color of the frame by partitioning colors of pixels of the frame into a plurality of color partitions, identifying a color partition having a greatest number of the pixels of the frame, and averaging the pixels of the identified color partition. The operations further include generating a plurality of color variants based on the dominant color by applying color parameters to color components of the dominant color, and generating, for each of the color variants and for each of a plurality of user interface component types, a user interface component color. The method identifies a playing state of the video, a current one of the identified frames before a current playing point in the video, and a next one of the identified frames after a the current playing point in the video. The method also identifies first user interface component colors based on the playing state and on the user interface component colors generated for the current identified frame, and second user interface component colors based on the playing state and on the user interface component colors generated for the next identified frame. The method sets colors of the user interface components of the video player based on the identified first user interface component colors and on the identified second user interface component colors.

In one embodiment, a computer-implemented method comprises identifying a dominant color of a frame of a video; generating a plurality of color variants based on the dominant color; identifying a playing state of the video; selecting one of the color variants based on the playing state; and setting colors of user interface components of the video user interface based on the selected color variant.

In one embodiment, a non-transitory computer-readable storage medium stores instructions executable by a processor. The instructions comprise instructions for identifying a dominant color of a frame of a video; instructions for generating a plurality of color variants based on the dominant color; instructions for identifying a playing state of the video; instructions for selecting one of the color variants based on the playing state; and instructions for setting colors of user interface components of the video user interface based on the selected color variant.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
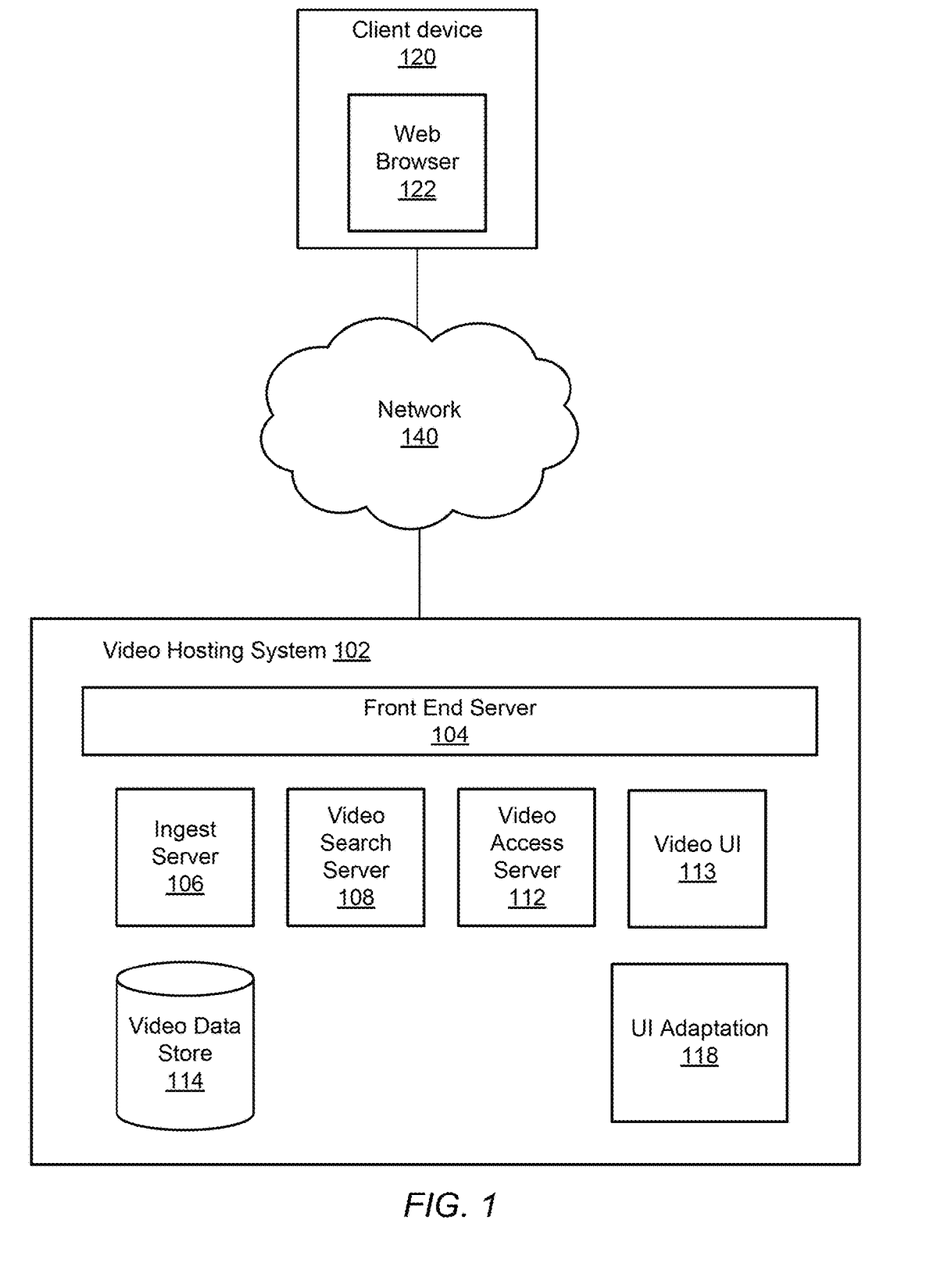
FIG. 1 is a high-level block diagram of an environment for video hosting and viewing, according to one embodiment.

FIG. 1 is a high-level block diagram of an environment for video hosting and viewing, according to one embodiment. FIG. 1 illustrates a video hosting system 100 and a client device 120 connected by a network 140. The client device 120 represents an entity that can access videos contained within the video hosting system 100. A user of the client device 120 can access a video from the video hosting system 100 by browsing a catalog of videos, conducting searches using keywords, reviewing play lists from other users or the system administrator (e.g., collections of videos forming channels), or viewing videos associated with particular user groups (e.g., communities). Additionally, in some embodiments, the video hosting system 100 is adapted to receive videos for storage in order to enable the sharing of the videos with other users.

In one embodiment, a user of the client device 120 uses the client device to communicate with the video hosting system 100 over the network 140. In one embodiment, the client device 120 is a personal computer executing a web browser 122 such as MICROSOFT INTERNET EXPLORER or GOOGLE CHROME that allows the user to view web pages and videos provided by the video hosting system 100. In one embodiment, the web browser 122 includes a video player (e.g., Flash™ from Adobe Systems, Inc.). The client device 120 may alternatively be a device such as a smart phone, a tablet, a television, a television "set-top box," or the like. Although FIG. 1 illustrates only a single client device 120, it should be understood that many client devices (e.g., millions) can communicate with the video hosting system 100 at any time. The single client device 120 is illustrated in order to simplify and clarify the present description.

The network 140 represents the communication pathways between the client device 120 and the video hosting system 100. In one embodiment, the network 140 is the Internet, but may also be any network, including but not limited to a LAN, a MAN, a WAN, a mobile, wired or wireless network, a cloud computing network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The video hosting system 100 represents any system that allows users to access video content via searching and/or browsing interfaces. The videos can be obtained from user uploads of videos, from searches or crawls of other websites or databases of videos, or the like, or any combination thereof. For example, in one embodiment a video hosting system 100 can be configured to allow for user uploads of content; in another embodiment a video hosting system 100 can be configured to only obtain videos from other sources by crawling such sources or searching such sources in real time.

A suitable video hosting system 100 for implementation of the system is the YOUTUBE™ website; other video hosting websites are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The video hosting system 100 comprises a front end server 104, an ingest server 106, a video search server 108, a video access server 112, a video user interface module 113, a video data store 114, and a user interface adaptation module 118. Many conventional features, such as firewalls, load balancers, application servers, failover servers, site management tools and so forth are not shown so as not to obscure the features of the system.

The front end server 104 handles all communication with the user via the network 140. The front end server 104 receives requests from client devices 120 and communicates with the other servers of the video hosting system 100 in order to process the requests. The front end server 104 is further configured to monitor user interactions with the video hosting system 100. For example, if a user clicks on a web page, views a video, makes a purchase, opens a document, fills a web-based form, the front end server 104 monitors these interactions. The front end server 104 may be further configured to transmit and present the requested video and related video links to the user on a webpage. The requested video is streamed by the front end server 104 to the user. One or more related video links appear on the webpage where the requested video is playing, such that the related video link can be selected by a user of a client device 120 in order to view the related videos.

Any content received via the network 140 from a user for posting to the video hosting system 100 is passed on to the ingest server 106 for processing. The processing of the video file includes assigning an identification number to the newly received video file. Other steps of processing the video file may include formatting (e.g., transcoding), compressing, metadata tagging, content analysis, and/or other data processing methods. The user transmits a form along with the video file transmitted to the video hosting system 100. The user may include in the form information that describes the video (e.g., title, description, and tag information). The form information may also include an indication of the media type, which for uploaded videos would always be the "video" type. The ingest server 106 stores the processed video file in a video data store 114 and stores the information included in the form as metadata of the video file. The video data store 114 is the storage system where the video files transmitted to the video hosting system 100 are stored. A video may be accompanied by icons or thumbnail views, associated metadata, such as title, author, tags, description, comments, and rating.

The video search server 108 processes any search query received by the front end server 104 from a user. The search query transmitted by the user to the front end server 104 includes search criteria, such as keywords that may identify videos the user is interested in viewing. For example, the search query might be the textual string "machu picchu". The video search server 108 may use the search criteria, for example, to query the metadata of and/or entities associated with all video files stored in the video data store 114 or to query the entity data store 118. The search results are the videos including entities that match the search query. For example, the search results for the search query "machu picchu" include video items that are annotated with the entity "machu picchu" that match the search query. The search results from the query are transmitted to the front end server 104, so that the search results can be presented to the user.

The video access server 112 receives, from the front end server 104, requests from users that wish to view (or play back) a specific video. From the user perspective, a user may submit a request for a video by browsing the different video categories of the video hosting system 100 or by clicking on a link to a video from a search results webpage. The request transmitted by the user can include the identification number of the video the user wishes to view (which can be included automatically once the user clicks on the link for the video). The video access server 112 uses the identification number to search and locate where the video is stored in the video data store 114. The video access server 112 provides the video requested to the front end server 104.

Figure 2:
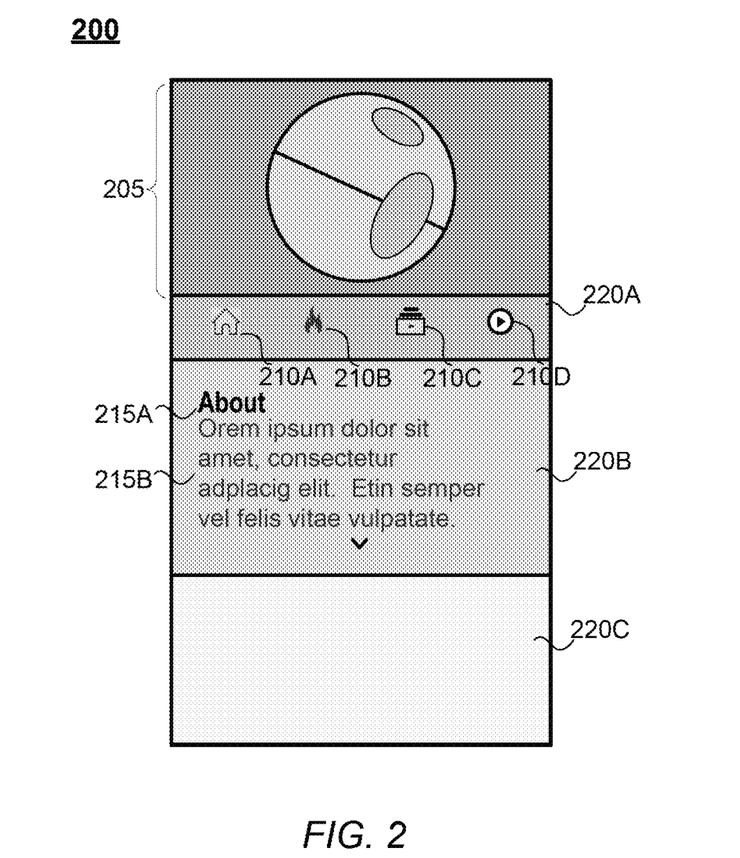
FIG. 2 illustrates one sample user interface appropriate for displaying a video on a mobile device, according to one embodiment.

The video hosting system 102 includes a video user interface module 113 that presents a video to a user as part of a user interface. The exact user interface provided by the video user interface module 113 may vary in different embodiments, and the same embodiment may make available different types of user interfaces. For example, FIG. 2 illustrates one sample user interface 200 appropriate for displaying a video on a mobile device, according to one embodiment. The user interface 200 includes a video display area 205 in which the frames of the video are displayed as the video is played; various video navigation controls 210 for navigating between videos, starting and stopping playback of the current video, and the like; heading and body text 215A and 215B; background regions 220; and the like. It is appreciated that the user interface illustrated in FIG. 2 is merely one example of a user interface, and that many others, such as user interfaces suitable for web browsers on traditional desktop or laptop computer screens, are equally possible.

In one embodiment, the video hosting system 102 additionally includes a user interface adaptation module 118 that modifies the appearance of a user interface for a video player in response to content of the currently-playing video and to a playing state of that video. For example, in one embodiment (described more below with respect to FIG. 3), the user interface adjustment module 118 determines a most representative color—herein referred to as the "dominant" color—from each of various frames of the video content and dynamically adjusts the colors of the various portions of the user interface based at least in part on the determined dominant color. In other embodiments, the user interface adjustment module 118 is alternatively and/or additionally located on the client device 120, e.g., as part of a custom video player application that interacts with the video hosting system 102 to obtain and play videos.

It should be appreciated that the data processing operations of the video hosting system 102, as described herein, inherently require a programmed computer system for their practical implementation. To simplify and clarify the present description, the content received and shared by the video hosting system 100 is generally referred to as videos, video files, or video items, as appropriate for the video-specific embodiments described herein, but it should be understood that the video hosting system 100 can receive and share content of any media type. This content may be referred to as media content items, media items, or items. Thus, the operations of the video hosting system 102 described herein can be applied to other types of media content items, not only to videos. For example, other suitable type of content items include visual documents from which color can be extracted, such as static images (either native images such as GIF or JPEG files, or those convertible to images, such as PDF files, word processing files, or the like), multi-slide presentations, and so forth.

User Interface Color Assignment

Figure 3:
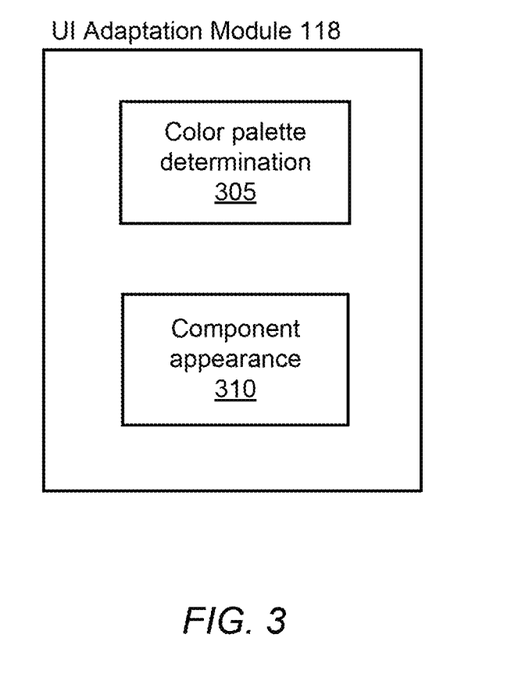
FIG. 3 is a high-level block diagram illustrating a detailed view of the user interface adaptation module of FIG. 1, according to one embodiment.

FIG. 3 is a high-level block diagram illustrating a detailed view of the user interface adaptation module 118, according to one embodiment. As shown in FIG. 3, the user interface adaptation module 118 includes several modules. Those of skill in the art will recognize that other embodiments can have different modules than the ones described here, and that the functionalities can be distributed among the modules in a different manner. In addition, the functions ascribed to the user interface adaptation module 118 can be performed by multiple modules.

As illustrated, the user interface adaptation module 118 includes a color palette determination module 305 and a component appearance module 310.

The color palette determination module 305 generates a palette of colors that complement the colors present in a given image, such as a frame of video. More specifically, the color palette determination module 305 determines a dominant color of the given image (e.g., frame of video) and generates a palette (set) of colors based on that dominant color. The palette of colors includes one or more constituent sub-palettes that indicate the colors to apply to different types of components of a user interface.

Figure 4:
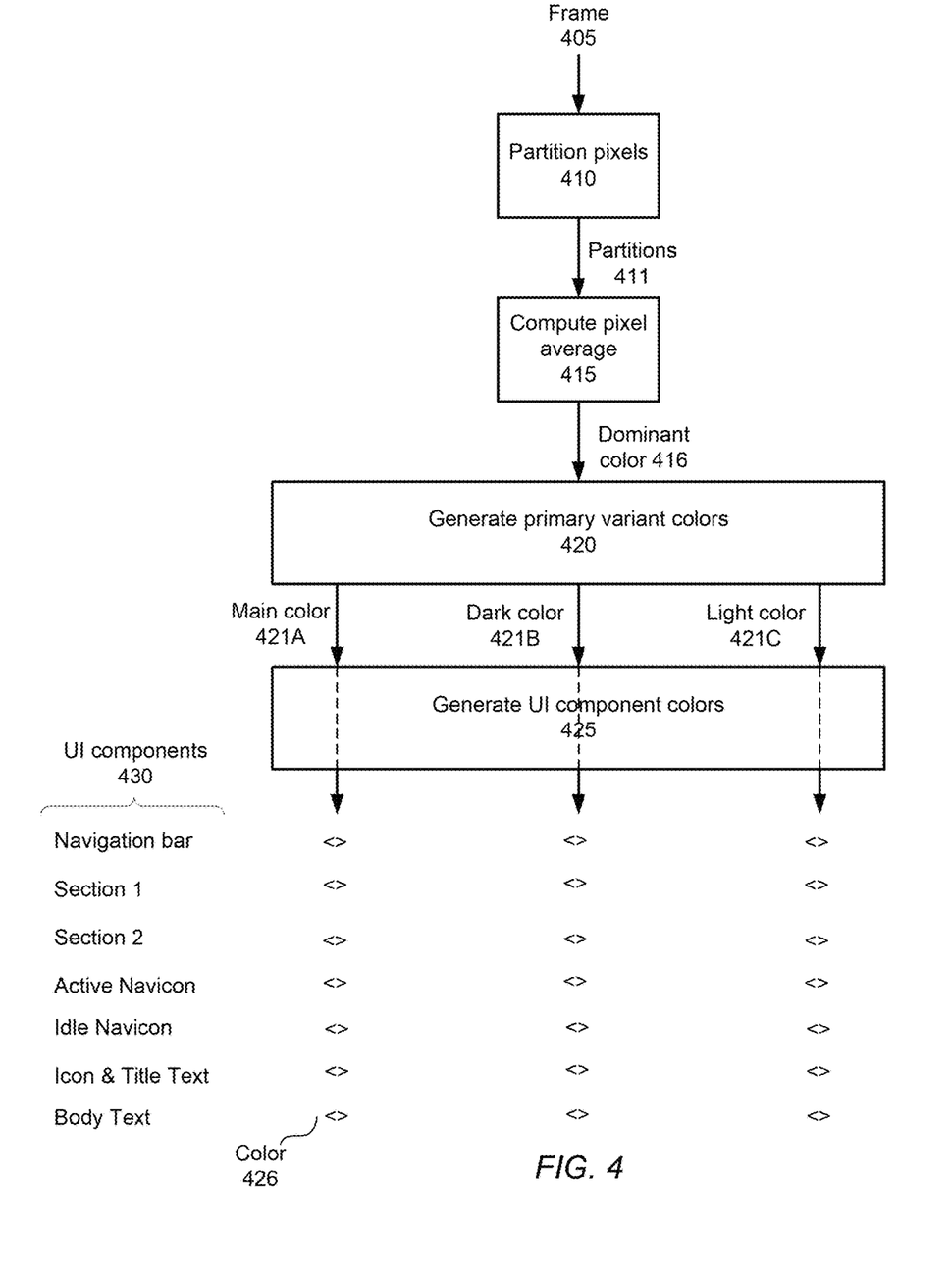
FIG. 4 is a data flow diagram illustrating the actions of the color palette determination module, according to an embodiment.

FIG. 4 is a data flow diagram illustrating the actions of the color palette determination module 305, according to an embodiment. Specifically, FIG. 4 illustrates an embodiment in which three variants of the dominant color are generated, and one or more sub-palettes are in turn generated for each of these variants, each sub-palette indicating colors to apply to the various types of components of the user interface.

The color palette determination module 305 receives a video frame 405 (or other image), and partitions 410 the pixels of the video frame. Partitioning the pixels involves dividing the color space into a set of partitions 411, assigning the various pixels (e.g., each pixel) of the video frame to one of the partitions. For example, assuming 24-bit colors (e.g., 8 bits for each of the hue, saturation, and value—or red, green, and blue—components), each of the $2^{24}$ possible colors is mapped to one of N (e.g., 1000) distinct partitions 411. The number of pixels in each partition is then counted, and the dominant color 416 is chosen from some number of the partitions with the most pixels. In one embodiment, the dominant color 416 is based on the single partition with the most pixels, and is chosen by averaging 415 the colors within that partition (e.g., computing the average of the <R, G, B> or <H, S, V> components of the pixels within the partition). In some embodiments, the color palette determination module 305 determines multiple dominant colors, e.g., one for each of the N partitions with the most pixels by averaging the colors within each partition.

With the dominant color 416 for the video frame 405 chosen, the color palette determination module 305 generates 420 color variants 421 of the dominant color that may be useful in certain contexts, as determined by factors such as the type of screen on which the video is being watch, the environmental conditions in which the video is being watched, the play status of the video (whether the video is playing or paused), or the like. In the embodiment illustrated FIG. 4, three variants are generated: a main color 421A, a dark color 421B, and a light color 421C.

In one embodiment, the color palette determination module 305 generates 420 the color variants 421 of the dominant color by selecting, for each color variant, a color that is most similar to the dominant color from a set of possible color variants. For example, in the embodiment illustrated in FIG. 4, the main color 421A, dark color 421B, and light color 421C each have some associated set of ranges of the hue (H) component, each range having a corresponding set of pairs of saturation (S) and brightness (B) parameter values. To generate a particular color variant (e.g., the main color 421A), the hue component of the dominant color is used to select one of the hue ranges corresponding to the color variant, the saturation component value is adjusted to the closest saturation parameter value for the selected range, and the brightness component value is likewise adjusted to the closest brightness parameter value for the selected range. This has the effect of using the hue component value to adjust the saturation and brightness component values when generating a color variant. As one particular example, the main color 421A has a hue range from 31°-80°, which in turn has saturation parameter values 15 and 85 and brightness parameter values 50 and 60. If the dominant color has HSB components <56°, 100, 100>, then the hue component 56° selects the hue range 31°-80° (since 56° is in the range from 31°-80°, the saturation component is adjusted to 85 (since the saturation component value 100 is closer to the saturation parameter 85 than to saturation parameter 15), and the brightness component is adjusted to 60 (since the brightness component value 100 is closer to the brightness parameter 60 than to the brightness parameter 50). Thus, in this example the application of the parameters corresponding to the main color 421A lead to generating the main color <56°, 85, 60> from the dominant color <56°, 100, 100>. The dark color 421B and the light color 421C are calculated in similar ways using their own corresponding parameter values.

With the color variants 421 generated, the color palette determination module 305 additionally generates 425 a set of UI component colors corresponding to different types of components in the video user interface created by the video UI module 113. For example, in the embodiment illustrated in FIG. 4, there are seven UI components colors generated for each of the color variants 421: one for each of a "navigation bar" UI component, a "section 1" UI component, a "section 2" UI component, an "active navicon" UI component, an "idle navicon" UI component, an "icon & title text" UI component, and a "body text" UI component. Referring again to the example user interface of the embodiment of FIG. 2, the "navigation bar" UI component corresponds to the background 220A; the "section 1" UI component corresponds to the background 220B; the "section 2" UI component corresponds to the background 220C; the "active navicon" UI component corresponds to component 210D (assuming that it is the component reflecting the current status of the video, such as "Playing"); the "idle navicon" UI component corresponds to the components 210A-210C (assuming that they do not reflect the current status of the video); the "icon & title text" UI component corresponds to text 215A; and the "body text" UI component corresponds to the text 215B.

In one embodiment, the color palette determination module 305 generates 425 the user interface component colors 426 for a given color variant 421 by selecting, for each type of user interface component, a color that is most similar to the color variant from a set of possible user interface component colors for that user interface component type. For example, in the embodiment illustrated in FIG. 4, each user interface component 430 (e.g., the navigation bar component) has some set of ranges of the saturation (S) component, each range having a corresponding set of brightness (B) parameter values. To form a particular user interface component color (e.g., the color for the navigation bar), the saturation component of the color variant is used to select one of the saturation ranges corresponding to the color variant, and the brightness component value is adjusted to the closest brightness parameter value for the selected saturation range. This has the effect of using the saturation component value to adjust the brightness component value when generating a user interface type color. As one particular example, the navigation bar user interface component type has a saturation range from 15-85, which in turn has corresponding brightness parameter values 45, 50, and 55. Referring to the above example of the main color variant with HSB components <56°, 85, 60>, the saturation component 85 selects the saturation range 15-85 (since the saturation component 85 is in the range from 15-85), and the brightness component is adjusted to 55 (since the brightness component value 55 is closer to the brightness parameter 60 than to the other brightness parameters 45 or 50). Thus, in this example the application of the parameters corresponding to the navigation bar user interface component type lead to generating the component color <56°, 85, 55>from the main color variant <56°, 85, 60>. The other user interface component types 430 have their colors calculated in similar ways using their own corresponding parameter values.

Returning again to FIG. 3, the user interface adaptation module 118 includes a component appearance module 310 that uses the color palette determination module 305 to generate a color palette for particular image (e.g., frame of a video) and sets the user interface components of the video user interface module 113 to the colors of the generated palette. For example, referring to the example of FIGS. 2 and 4, the component appearance module 310 sets the color of the background 220A to the color for the navigation bar user interface component, the color of text 215B to the color for body text user interface component, and so forth.

In the case of a video (as opposed to a static image), the component appearance module 310 repeatedly uses the color palette determination module 305 on different frames of the video in order to continuously adjust the colors of user interface components as the video plays.

Figure 5:
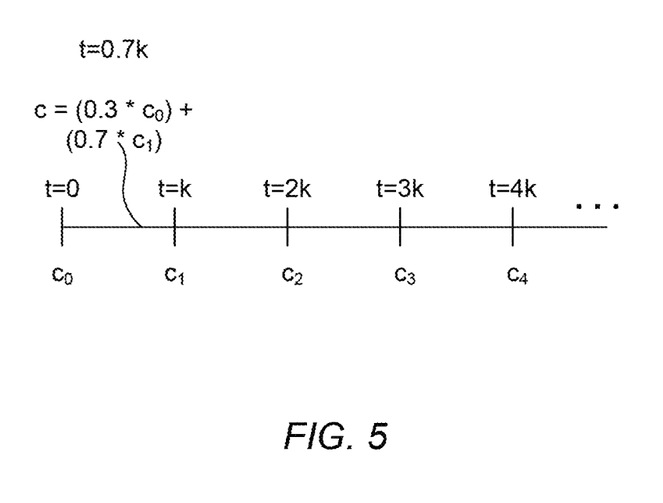
FIG. 5 illustrates generation of color palettes and user interface component color interpolation for a set of frames, according to an embodiment.

For example, in one embodiment illustrated in FIG. 5, the component appearance module 310 uses the color palette determination module 305 at fixed intervals (e.g., every N frames, or the frames for every t seconds), at each frame choosing a color corresponding to that frame and setting the user interface component colors accordingly. This allows the user interface appearance to vary over time along with the content being displayed in the video frames.

In one embodiment, in order to achieve smoother color transitions, the component appearance module 310 blends dominant colors over time, such as by linear interpolation. That is, by a time t the component appearance module 310 has calculated not only the colors for the frames corresponding to t, but also the colors for the frames corresponding to the next interval (at time t+k). At each of some smaller intervals (e.g., every screen refresh), the component appearance module 310 determines where the corresponding frame lies compared to the "current" frame (the frame corresponding to time t) and the frame at the next interval (the frame corresponding to time t+k). That is, if one of the colors calculated for a time $t_i$ is $c_i$, and a corresponding one of the colors for the next time $(t_i+k)$ is $c_{i+1}$ and the time at which an interpolated color is calculated is $t_r$, then a corresponding interpolated color $c_r$ is given by the equation $c_r=((t_r-t_i)/k*c_i)+((t_{i+1}-t_r)/k*c_i)$. (The product of a scalar and a color is the array of components of the color scaled by the scalar.) For example, as illustrated in FIG. 5, if a particular screen refresh occurred at time $t_r=0.7k$, the corresponding interpolated color $c_r$ would be $c_r=(0.7/k*c_i)+(0.3/k*c_{i+1})$.

In one embodiment, when blending colors at the current frame (e.g., at every screen refresh), the component appearance module 310 obtains the top N dominant colors from the color palette determination module 305, for some integer N (e.g., N=5) and selects, as the dominant color of the next interval (for the frame at time t+k), the one of those dominant colors that is most similar to the current dominant color (for the frame at time t). The component appearance module 310 then blends the current dominant color with this most similar dominant color. The blending with the most similar dominant color helps to prevent abrupt color changes, which may appear disconcerting to a user.

In one embodiment, when a video is first accessed by a user, the component appearance module 310 makes the first determination of the dominant color (i.e., the determination for t=0) based on a cached thumbnail for the video, if available. This permits the determination of the first color to be made—and the user interface components to be colored accordingly—essentially immediately, rather than waiting for the period required to begin video streaming (e.g., several hundred milliseconds). In situations where it is not feasible to recalculate the dominant color over multiple intervals, the single dominant color extracted from the cached thumbnail can be used throughout the video, although this will not provide as optimal a matching of user interface component colors to the video content.

In one embodiment, the component appearance module 310 sets the colors of the user interface components based on the colors generated from frames using the color palette determination module 305 and also on a playing state of the video. For example, if the video is playing, it may be aesthetically pleasing to a user to de-emphasize the user interface components so as not to visually compete with the playing video. Conversely, if the video is paused or otherwise not playing, the user interface components can be more emphasized. In some embodiments, other factors—such as the degree of ambient light as determined by light sensor hardware of the client device 120, or the properties of the screen of the client device (e.g., size, degree of screen reflectivity)—may also influence the choice of colors to use.

For example, in one embodiment, the playing state of the video determines which color variant is used, with the dark color 421B being used when the video is not playing, and then main color 421A being used when it is not. For example, when the video is playing, the background 220A is set to the color generated for the navigation bar user interface component within the sub-palette generated for the dark color 421B; if the user pauses the video, then the background 220A may be set to the color generated for the navigation bar user interface component within the sub-palette generated for the main color 421A.

Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which are set forth in the following claims.

What is claimed is:

1. A computer-implemented method comprising:
   identifying a dominant color of a frame of a video;
   generating a plurality of color variants based on the dominant color;
   causing at least one frame of the video to be presented on a user device within a video user interface, wherein the video user interface has user interface components each having a color selected based on the plurality of color variants;
   identifying a playing state of the video on the user device; and
   setting colors of the user interface components of the video user interface based on a color variant from the plurality of color variants that was selected based on the playing state of the video on the user device.

2. The computer-implemented method of claim 1, further comprising:
   identifying a second dominant color of a second frame of the video;
   generating a second plurality of color variants based on the second dominant color; and
   selecting one of the color variants from the second plurality of color variants based on the playing state.

3. The computer-implemented method of claim 2, further comprising:
   causing the colors of the user interface components of the video user interface to be modified to be the selected color variants of the second plurality of color variants; and
   causing the second frame of the video to be presented on the user device within the video user interface.

4. The computer-implemented method of claim 2, wherein causing the colors of the user interface components of the video user interface to be modified comprises:
   identifying a current time within the playing of the video;
   determining a first time difference of the current time from a time in the video corresponding to the frame, and a second time difference of the current time from a time in the video corresponding to the second frame; and
   interpolating the user interface colors based on the first time difference, the second time difference, the dominant color, and the second dominant color.

5. The computer-implemented method of claim 1, wherein the dominant color of the frame is identified by:
   partitioning colors of pixels of the frame into a plurality of color partitions;
   identifying a color partition having a greatest number of the pixels of the frame; and
   calculating an average of color component values of each pixel in the identified color partition.

6. The computer-implemented method of claim 1, wherein generating the plurality of color variants based on the dominant color comprises:
   identifying color parameters corresponding to the plurality of color variants; and
   applying the color parameters to color components of the dominant color.

7. A computer-implemented system comprising:
   a hardware processor that is configured to:
      identify a dominant color of a frame of a video;
      generate a plurality of color variants based on the dominant color;
      cause at least one frame of the video to be presented on a user device within a video user interface, wherein the video user interface has user interface components each having a color selected based on the plurality of color variants;

identify a playing state of the video on the user device; and set colors of the user interface components of the video user interface based on a color variant from the plurality of color variants that was selected based on the playing state of the video on the user device.

8. The computer-implemented system of claim 7, wherein the hardware processor is further configured to:

identify a second dominant color of a second frame of the video;

generate a second plurality of color variants based on the second dominant color; and select one of the color variants from the second plurality of color variants based on the playing state.

9. The computer-implemented system of claim 8, wherein the hardware processor is further configured to:

cause the colors of the user interface components of the video user interface to be modified to be the selected color variants of the second plurality of color variants; and cause the second frame of the video to be presented on the user device within the video user interface.

10. The computer-implemented system of claim 8, wherein causing the colors of the user interface components of the video user interface to be modified comprises:

identifying a current time within the playing of the video;

determining a first time difference of the current time from a time in the video corresponding to the frame, and a second time difference of the current time from a time in the video corresponding to the second frame; and interpolating the user interface colors based on the first time difference, the second time difference, the dominant color, and the second dominant color.

11. The computer-implemented system of claim 7, wherein the dominant color of the frame is identified by:

partitioning colors of pixels of the frame into a plurality of color partitions;

identifying a color partition having a greatest number of the pixels of the frame; and calculating an average of color component values of each pixel in the identified color partition.

12. The computer-implemented system of claim 7, wherein generating the plurality of color variants based on the dominant color comprises:

identifying color parameters corresponding to the plurality of color variants; and applying the color parameters to color components of the dominant color.

13. A non-transitory computer-readable storage medium storing computer-executable instructions that, when executed by a processor, cause the processor to perform a method, the method comprising:

identifying a dominant color of a frame of a video;

generating a plurality of color variants based on the dominant color;

causing at least one frame of the video to be presented on a user device within a video user interface, wherein the video user interface has user interface components each having a color selected based on the plurality of color variants;

identifying a playing state of the video on the user device; and setting colors of the user interface components of the video user interface based on a color variant from the plurality of color variants that was selected based on the playing state of the video on the user device.

14. The non-transitory computer-readable storage medium of claim 13, wherein the method further comprises:

identifying a second dominant color of a second frame of the video;

generating a second plurality of color variants based on the second dominant color; and selecting one of the color variants from the second plurality of color variants based on the playing state.

15. The non-transitory computer-readable storage medium of claim 14, wherein the method further comprises:

causing the colors of the user interface components of the video user interface to be modified to be the selected color variants of the second plurality of color variants; and causing the second frame of the video to be presented on the user device within the video user interface.

16. The non-transitory computer-readable storage medium of claim 14, wherein causing the colors of the user interface components of the video user interface to be modified comprises:

identifying a current time within the playing of the video;

determining a first time difference of the current time from a time in the video corresponding to the frame, and a second time difference of the current time from a time in the video corresponding to the second frame; and interpolating the user interface colors based on the first time difference, the second time difference, the dominant color, and the second dominant color.

17. The non-transitory computer-readable storage medium of claim 13, wherein the dominant color of the frame is identified by:

partitioning colors of pixels of the frame into a plurality of color partitions;

identifying a color partition having a greatest number of the pixels of the frame; and calculating an average of color component values of each pixel in the identified color partition.

18. The non-transitory computer-readable storage medium of claim 13, wherein generating the plurality of color variants based on the dominant color comprises:

identifying color parameters corresponding to the plurality of color variants; and applying the color parameters to color components of the dominant color.

* * * * *